United States Patent
Ritter

(10) Patent No.: US 6,543,686 B1
(45) Date of Patent: Apr. 8, 2003

(54) IDENTIFICATION CARD AND BILLING PROCESS WITH AN IDENTIFICATION CARD

(75) Inventor: Rudolf Ritter, Zollikofen (CH)

(73) Assignee: Swisscom AG, Bern (CH)

( * ) Notice: Subject to any disclaimer, the term of this patent is extended or adjusted under 35 U.S.C. 154(b) by 0 days.

(21) Appl. No.: 09/622,183

(22) PCT Filed: Feb. 15, 1999

(86) PCT No.: PCT/CH99/00070

§ 371 (c)(1),
(2), (4) Date: Aug. 14, 2000

(87) PCT Pub. No.: WO99/41919

PCT Pub. Date: Aug. 19, 1999

(30) Foreign Application Priority Data

Feb. 16, 1998  (CH) .................................................. 367/98

(51) Int. Cl.⁷ ................................................. G06K 5/00
(52) U.S. Cl. .................. 235/380; 235/382; 235/474; 235/487; 92/2; 92/4; 92/26
(58) Field of Search ................................. 235/380, 382, 235/474, 487; 902/2, 4, 5, 26

(56) References Cited

U.S. PATENT DOCUMENTS

| | | | | |
|---|---|---|---|---|
| 5,027,388 A | * | 6/1991 | Bradshaw et al. | 379/112 |
| 5,295,180 A | * | 3/1994 | Vendetti et al. | 455/435 |
| 5,487,084 A | | 1/1996 | Lindholm | |
| 5,590,092 A | * | 12/1996 | Fehnel | 368/10 |
| 5,696,902 A | * | 12/1997 | Leclercq et al. | 235/380 |
| 5,740,129 A | * | 4/1998 | Frampton | 368/10 |
| 5,907,832 A | * | 5/1999 | Pieterse et al. | 705/39 |
| 5,920,824 A | * | 7/1999 | Beatty et al. | 368/21 |
| 5,930,701 A | * | 7/1999 | Skog | 455/415 |
| 5,966,653 A | * | 10/1999 | Joensuu et al. | 455/414 |
| 5,995,846 A | * | 11/1999 | Jakobsen | 368/47 |
| 6,035,216 A | * | 3/2000 | Cheng et al. | 235/475 |
| 6,036,090 A | * | 3/2000 | Rahman et al. | 235/380 |
| 6,139,431 A | * | 10/2000 | Walker et al. | 463/20 |
| 6,142,369 A | * | 11/2000 | Jonstromer | 235/380 |
| 6,192,237 B1 | * | 2/2001 | Clapton et al. | 455/422 |
| 6,223,050 B1 | * | 4/2001 | Roberts, Jr. | 368/47 |
| 6,226,364 B1 | * | 5/2001 | O'Neil | 379/119 |

FOREIGN PATENT DOCUMENTS

| | | |
|---|---|---|
| EP | 0 186 038 | 7/1986 |
| EP | 0770953 A2 * | 4/1994 |
| EP | 0 656 733 | 6/1995 |
| FR | 2 613 101 | 9/1988 |
| WO | WO 97/40616 | 10/1997 |

* cited by examiner

Primary Examiner—Karl D. Frech
Assistant Examiner—Seung Ho Lee
(74) Attorney, Agent, or Firm—Pillsbury Winthrop LLP

(57) ABSTRACT

A method and apparatus for billing connections of a subscriber identified by a SIM card in a telecommunications network to the subscriber user, including determining the duration and time of the connection using a time-measuring device integrated into the SIM card, which is synchronized with an external clock signal, and determining the amount to be charged based upon connection duration and time and at least one remotely loadable tariff table stored in the SIM card. The time-measuring device can be checked by a time server in the infrastructure, and, if necessary, can be adjusted. The method and apparatus can be used for prepaid as well as for post-paid cards. All data for determining the amount to be charged are available on the SIM card, allowing billing to take place at the source, at the user. No other billing system is required in the infrastructure.

30 Claims, 2 Drawing Sheets

IDENTIFICATION CARD AND BILLING PROCESS WITH AN IDENTIFICATION CARD

The present invention relates to a billing method in a telecommunications system. The invention relates more specifically, but not exclusively, to a billing method which can be carried out with an identification card as well as to a corresponding identification card.

In telecommunications networks, for example in telecommunications networks based on the Global System for Mobile Communications (GSM) standard, the connection fees to be charged depend upon various parameters, among others the duration of the connection, the time of day and the geographic location of the calling and called user. These parameters, in particular the duration of the connection, are established in the infrastructure of the network, for example in a billing center. From these parameters the connection fee can then be determined and can be charged to the account of the user at the network operator or at a financial institution. This billing method is extremely time-consuming and expensive for the network operator, and requires a complex billing system and many manual or semi-automatic operations.

In addition to these post-paid billing methods, prepaid systems are also known. Prepaid systems usually make use of a user-specific identification card including an account that can be loaded with a monetary amount. The fees for the connections of the user are then charged to this account after each connection. Various methods are known by which money can later be loaded again into the account. The parameters needed to determine the fees to be charged are known by the term CAI (Charge Advice Information), and are established at a billing center administrated by the network operator, and transmitted to the identification card of the user with signalling messages. Processing means in the card then indicate the amount to be charged on the display of the mobile device in the local currency, and debit this amount from the stored monetary amount.

Prepaid billing methods are usually cheaper for the network operator since no invoice has to be written. The amounts to be charged still have to be determined, however. Moreover this method can be applied in the GSM sphere only with devices and in geographic locations where the Advice of Charge (AOC) function, defined in standard ETSI ETS300 510 (corresponding to the technical specification GSM 02.24), can be applied. Therefore prepaid cards usually allow only very limited roaming possibilities, and often can only be used in a single mobile network.

Prepaid methods are also known in connection with intelligent network solutions. However, these methods require an intelligent network infrastructure (INI), are expensive to use, and likewise can only be applied in the network of the respective operator.

It is therefore the object of the invention to propose an improved billing method, which does not have the drawbacks of the known methods, in particular a billing method simplified for the network operator.

These objects are attained, according to the invention, with the aid of an identification card as defined in the independent identification card claim and with a method as defined in the independent method claims, various variants being described in the dependent claims.

The billing method according to the invention is carried out with an identification card for users of a terminal, which card can be inserted in a removable way in a terminal; in addition to conventional data processing means enabling the storing of data including at least identification data, (IMSI (International Mobile Subscriber Identity), MSISDN (Mobile Station Identity Number) or IDUI (International Debit User Identification), of the user, said card contains an integrated time-measuring device, with which the duration of the connection can be established, and rating means (1014), with which the fee to be billed is determined on the basis of the duration of the connection and the time of the connection measured with the integrated time-measuring device (100). The integrated time-measuring device is synchronized with an external clock signal, e.g. from the terminal.

If the identification card is used in different mobile devices, which use different quartz elements with differing frequencies, e.g. frequencies between 3.5 and 5.5 MHz, this frequency is preferably established with the integrated oscillator of the time-measuring device, and the division factor in the frequency divider is adjusted accordingly. In addition to this information, the type of mobile device, e.g. the mobile device trademark, will preferably also be recognized and stored in the memory area of the identification card for further purposes.

In this way all the parameters necessary for determining the fee to be charged can be established directly in the card so that all fee calculations can be carried out at the source, at the user.

The determined amount can then either be debited directly from a prepaid account on the identification card and/or, in the case of a post-paid card, packed in a billing record and transmitted in the telecommunications network to a billing collector.

The patent document EP 0 656 733 describes a billing system for mobile devices in which all connection parameters needed to determine the fee to be charged are stored in the memory of the mobile device. This amount can then be is shown, for information, on the display of the mobile device. Not described in this document, however, is how the determined fee can be automatically billed. Moreover the time and duration of the connection are determined with the aid of the internal clock of the mobile device. The network operator has no influence upon the accuracy of the clock in mobile devices offered by other producers. In most mobile devices this clock can be set by the users, so there can easily be abuse in that the clock is set to a cheaper tariff period.

The patent document FR 2680261 describes a telephone chipcard which contains a prepaid account as well as tariff tables. The fees billed for connections are determined from a prepaid account on the basis of call length and stored tariffs. The time and the duration of calls are also established in an external device.

According to the invention, on the other hand, the entire time-measuring device, except for the quartz, is integrated into the chipcard provided by the network operator, so that it cannot be adjusted or influenced by the user or by the mobile device producer. Moreover various mechanisms allow the accuracy and the operation of the time-measuring device to be checked by a time server in the network.

A SIM card with a continuous measuring device is already known from WO96/11545. This card can only be used for an amount of time loaded in a timer in the card. This document does not describe, however, how the amounts to be billed can be automatically charged to the customer.

EP 0 770 953 describes another chipcard with an integrated clock, which can be used, however, only for signing electronic documents, and not for billing of connections.

A SIM card with an integrated timer ("clock") which can be used to determine the duration of connections is described as a variant in the patent application WO97/40616. This document does not describe, however, how the clock can be synchronized. How a quartz crystal can be incorporated into a chipcard was not known at the time of this application, however. A non-synchronized, electronic clock has a precision of approximately one percent or about one quarter hour per day; moreover the possibility is not mentioned that the time on the clock can be checked and controlled remotely. The SIM card described therefore can hardly be used for any precise billing of fees.

Furthermore the SIM card described in WO97/40616 contains no prepaid monetary amount, so a second prepaid card with an electronically stored monetary amount is needed. The two cards have to be inserted into the mobile device at the same time, or one after the other. An extensive modification of the mobile device is thus necessary so that the two different chipcards can be received. Consequently this system can hardly be used for modern, miniaturized mobile devices.

In contrast, in the identification card according to the invention the clock can run very precisely because it is synchronized with an external clock signal, for example from a quartz crystal in the mobile device. In addition, the set time can be checked at any moment by a central station, and, if necessary, adjusted. At most only minimal adaptations will be necessary on mobile devices in order to use the method according to the invention.

Described in the patent application FR 2 613 101 A1 is a chipcard, in particular a card for payment purposes, which can be connected to an external device, for example a card reader. The chipcard described in the patent application FR 2 613 101 A1 further comprises an interface circuit with a frequency divider by means of which the timing rate of a clock signal supplied by the external device can be divided down so that a suitable timing rate for the data transfer between the card and the external device can be derived in the card from the timing signal supplied by the external device.

The present invention will be better understood with the aid of the description, which is presented as an example and illustrated with the figures.

Figure 1:
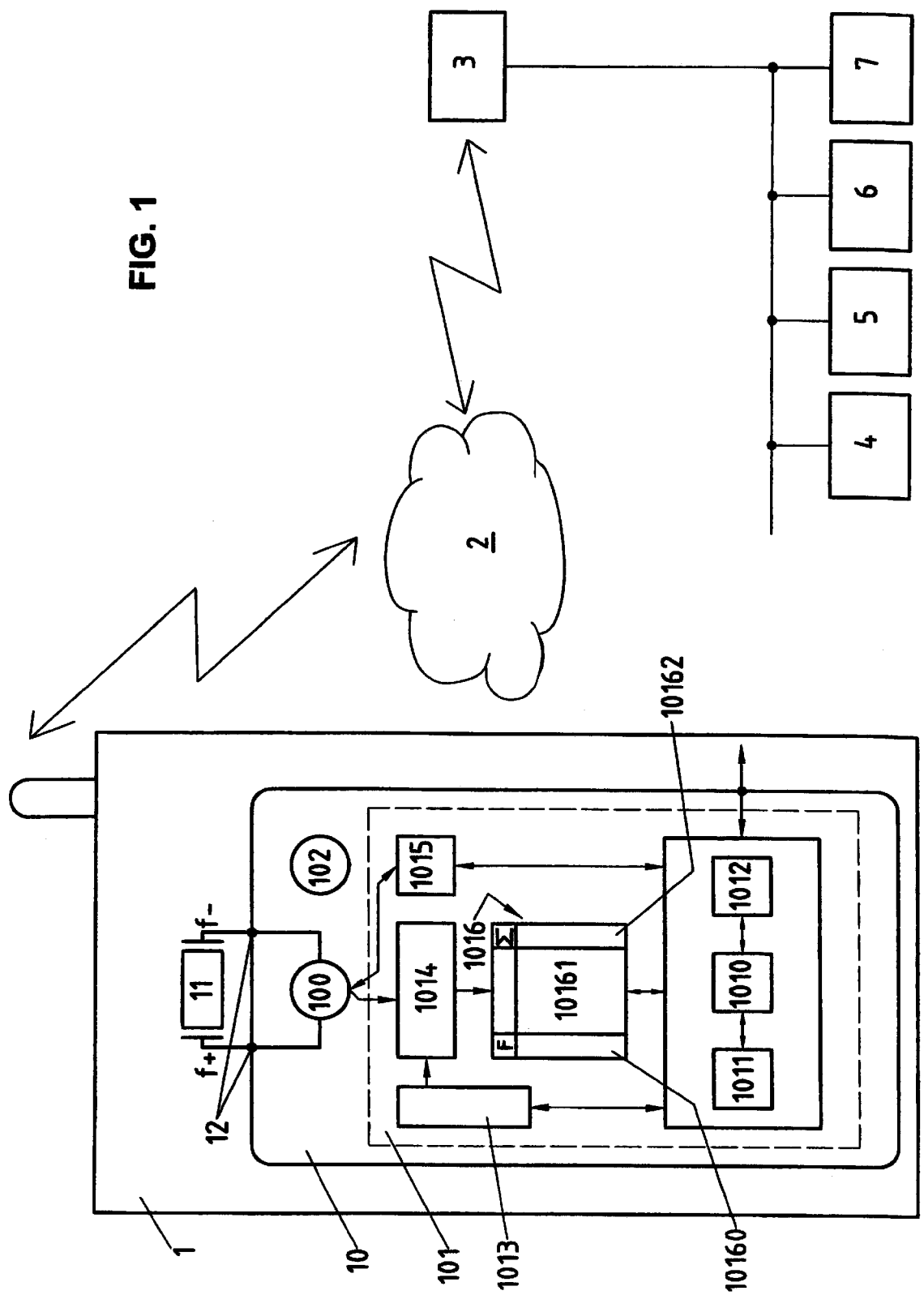
FIG. 1 is a block diagram of a system according to the invention with an identification card according to the invention shown schematically.

Indicated symbolically by the reference numeral 1 is a terminal, for example a GSM mobile telephone or a programmable device with communications possibilities. The terminal 1 contains a removable identification element 10, for example a SIM card 10 (Subscriber Identity Module), which identifies the user in the telecommunications network 2. SIM cards are described, for example, in the technical specification GSM 11.11 and GSM 11.14, available from the Secretariat of the European Telecommunications Standards Institute, F-06921 Sophia Antipolis, France, since 1995, or respectively 1996. Other SIM cards are also being used in, among other things, GSM, Digital Communication System (DCS), Universal Mobile Telephone System (UMTS), or Personal Communications Services (PCS) mobile devices, or will be used soon also in fixed networks with user identification through chipcards. The SIM card can be either a full-sized card or a plug-in card; it is connected to the terminal 1 by means of a contact area (not shown) on the surface of the card. Other electronic identification elements, other card formats and contactless cards can also be used, however, within the framework of this invention, for example multipurpose cards known by the designation Opencard.

The SIM card 10 contains data processing means 101, for example a known GSM-SIM microcontroller. The SIM card contains in addition known means 1010 to transmit and receive special short messages, for example Short Message Service (SMS) or Unstructured Supplementary Services Data (USSD) short messages, and preferably known filter means 1011 to recognize and interim store special short messages, preferably according to the SICAP™ method, which is described in the patent EP 0 689 368 B1, among other sources. Encryption and signing means 1012 are preferably also provided to encrypt and sign transmitted files, or respectively to decrypt received files and to check their signature. The TTP (Trusted Third Party) method can be used as the encryption and signing method, for example, or also encryption means can be used which work according to a point-to-point (PTP) method.

According to the invention, the SIM card further comprises an integrated time-measuring device 100, with which the time and duration of the operations, e.g. connections, can be established. The time-measuring device can contain hardware and possibly also software means. In a preferred variant, however, the time-measuring device comprises a clock with an oscillator and a frequency divider of known type as well as preferably compensation means known from the watch-making industry in order to compensate temperature-related operational deviations. The entire time-measuring device is integrated into the chipcard; it is synchronized however with an external clock signal f+, f− from the mobile device 1. The frequency signal f+, f− is preferably generated by a quartz element 11 which is present anyway in the mobile device, and is transmitted to the SIM card 1. This frequency signal is usually transmitted anyway through the common contact areas (12) on the surface of the cards; if this is not the case, a new interface can be optionally defined between the card and the mobile device for this purpose. The time-measuring device is preferably supplied, when the terminal is turned off, by an energy store 102 contained in the card 10, for example an accumulator or capacitor.

If the SIM card 10 is used in different mobile devices 1, which use different quartz elements having differing quartz frequencies, e.g. differing frequencies between 3.5 and 5.5 MHz, the frequency used is preferably determined with the oscillator of the time-measuring device 100. The division factor is then adjusted accordingly in the integrated frequency divider.

The frequency used for the signal f+, f− is usually indicated by the trademark or the type of mobile device. This information is preferably recognized, and is temporarily stored in the memory area of the SIM card 10 for further purposes.

The microcontroller 101 carries out the various processes in the card. A memory, for example an EEPROM, indicated by implication, is contained in the microcontroller 101 or is connected thereto. The memory contains programs and files which the user cannot change. In this protected area, data and programs, for example JAVA applets, can be loaded or respectively changed only during production of the card using a protected process inside the card, or later through the infrastructure 3–7 with signed records. Contained in the protected area are, in addition to conventional GSM data and programs, programs for TTP encryption and signing functions 1012 as well as at least one private and/or at least one public key. According to the invention, a time-measuring device adjustment register 1015 is also contained in this area with which the time-measuring device 100 can be adjusted. A rating system 1014 consists of program modules and data in this protected area with which the connection fees can be calculated based upon the time and duration of the connection determined with the time-measuring device 100. The tariff components for this calculation are stored in a tariff table 1013 in this protected area. The tariff table 1013 and the adjustment register 1015 can be updated with special SMS or USSD messages from the network infrastructure, as described further below.

The protected area further contains a rating table 1016 with all recorded details on connections (Call Details), which will be needed for billing each individual connection carried out. Each line in this table corresponds to a particular connection made or operation otherwise billed with the card 10. The first column 10160 in the table 1016 contains a flag, which indicates whether the corresponding connection details have been transmitted already to the billing collector 4. The second column 10161 contains connection details, such as, for example, time of day of the connection, duration of the connection, location of user A, location of user B, etc., as well as the connection fee, which the rating system has calculated from these data and from the tariff table 1013. In a preferred embodiment, this column contains all known CDR components (Call Detail Records) in the GSM sphere.

As already mentioned, the present invention can be used for prepaid cards as well as for post-paid cards. In the case of a prepaid card, the last column 10162 contains the prepaid amount remaining on the card. The fee in field 10161, determined after each connection, is subtracted from this amount. If the remaining amount 10162 is less than or equal to zero, the SIM card is blocked or at least for all numbers except some calling numbers, service numbers and otherwise free-of-charge numbers stored in a special file. The SIM card can only be used again when reloaded with a monetary amount, preferably by means of special reload messages from the infrastructure. Suitable methods of loading a monetary amount onto a SIM card are already known, and are already being used, for example, by the present applicant for the service known under the commercial name EASY. The patent application EP 96810570.0 describes the most important parts of this process.

The method according to the invention can also be applied to a post-paid system. In this case the third column 10162 contains the sum of the recorded fee for all connections not billed. The SIM card is preferably likewise blocked completely or partially when the sum 10162 exceeds a limit defined by the network operator or by the customer.

The fee in column 10161, determined for each connection, is preferably shown after each connection or already during said connection on the display of the mobile device 1. The remaining amount or respectively the sum 10162 can preferably likewise be displayed at any time. In a variant, and depending upon the mobile device, all connection details can also be displayed in field 10161.

Means (not shown) are preferably provided to delete the rating table 1016 is partially or completely. The connection details indicted already by the flag 10160 as transmitted are preferably deleted automatically after a predefined or selected time interval. The SIM card is preferably blocked if the table 1016 has no space left for new connections; in this case the only resort is to transfer connection details 10161 to the time server, using a suitable routine, and to delete them from the table 1016.

In a variant, to save memory space, the usually very redundant data in the table 1016 can be compressed using a suitable algorithm.

Other optional, stored identification parameters in the protected area of the SIM card allow the SIM card 1 to be used, for example, as an identification card in another telecommunications network, for an external device, in a network computing (NC) device, in a mobile network computing (MNC) device, in a pay-TV decoder or with all other conceivable devices where user identification with chipcards is used. In this case the method according to the invention can also be used for billing these additional applications. Corresponding details on use are likewise stored in the table 1016.

The SIM card 1 is connected with a telecommunications network 2, for example a GSM network, when inserted in the terminal 1. A SIM server 3 is likewise linked to the network 2, and can communicate with the card 10 through special messages over the network 2, e.g. SMS or USSD messages. Known filter means in the server 3 allow data, instructions and programs (e.g. programs in an object-oriented language such as JAVA™) to be exchanged between the SIM server and an identification card 10 provided with the aforementioned filter means 1010, 1011. The SIM server 3 is preferably connected moreover to a TTP server 7, to permit protected communication with the SIM cards 10. Ensured thereby is that the confidentiality, authenticity of identity, authenticity of information, integrity and indisputableness of origin of the various messages are guaranteed. A point-to-point encryption and signing method can, however, also be used.

The SIM server 3 is likewise connected to a time server 5, which sets and checks the time-measuring device integrated into the SIM card 10, as will be described further below. An authorized tariff server 6 sets and checks the tariff table integrated into the SIM card. A billing collector 4 can receive data from the rating table 1016 in the SIM cards. For example, it can receive and decrypt the billing records containing connection details from the table 1016, and can check the signature.

In the case of a prepaid card, the billing collector can check the record of fees in this way, and, if commanded to do so, can reload the stored monetary amount. In the case of a post-paid card, the billing collector collects the billing records generated for each connection, sorts them according to financial services provider, and transmits them to the corresponding financial services provider.

The billing records can either be transmitted to the billing collector after each connection and be marked as such or preferably be transmitted and marked in batch mode, for example every week, every month or even after a certain number of connections. In a variant, the entire rating table 1016 is transmitted, for example, when the SIM card is logged into the network, or (in the case of a prepaid card) when the remaining amount drops below zero, or (in the case of a post-paid card) exceeds the limit.

The communication between the various servers 3 to 7 and the SIM cards 10 takes place, as already mentioned, through the telecommunications network 2, in this case a GSM network. The roaming possibilities established in the GSM system then allow use of the billing method according to the invention in all networks, which have a roaming agreement with the home network of the user. This method can then be used in all GSM900, GSM1800, PCS1900 and also DCS1900 single networks linked by roaming agreement, as will be explained later.

The roaming methods are described, for example, by I. Brini et al. In "International Roaming in Digital Cellular Networks," CSELT Technical Reports, Volume XX, No. 6, Italy, December 1992, pages 531–536, or by the same authors in "European Roaming-related Technical Problems," CSELT Technical Reports, Volume XX, No. 3, Italy, June 1992, pages 209–215.

The duration of the connection and the time of day of the connection are determined, as already mentioned, by the time-measuring device 100 in the identification element 10 made available by the network operator. This time-measuring device can only be adjusted from the infrastructure, in particular by means of the time server 5. The adjustment takes place with signed time adjustment records, which contain the time and which are preferably transmitted through the user information channel or as USSD messages in the signalling layer. Since the signature can only be added by the time server, transmission of a falsified time adjustment record is excluded.

Figure 2:
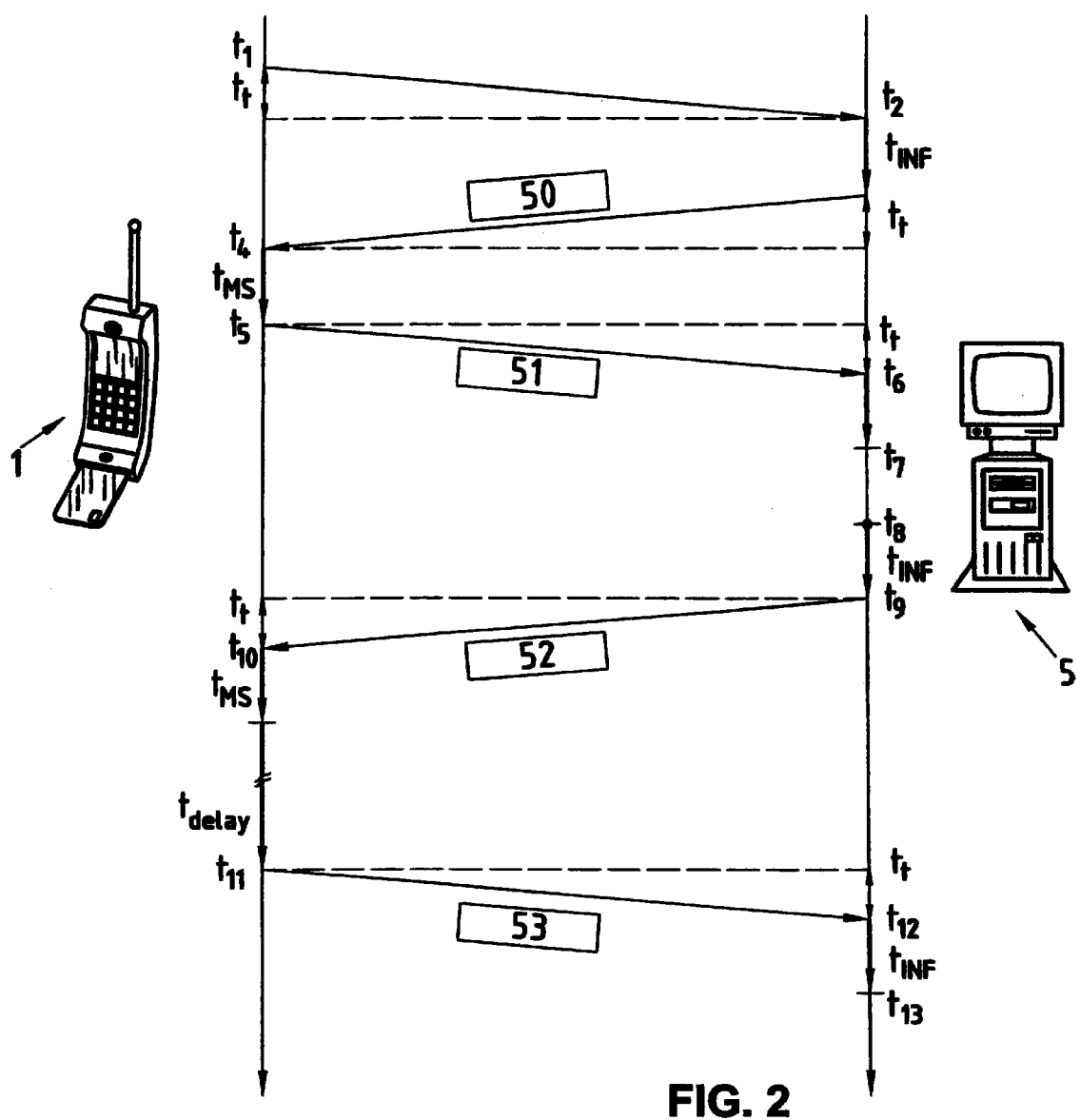
FIG. 2 is a diagram which explains the transmission of the various checking records.

The running of the time-measuring device is determined by a quartz element integrated into the mobile device 1; the customer and in any case the mobile device manufacturer can have access to this element, and, for example, replace it with a faster one in order to be able to measure a shorter connection duration. To ensure optimal security, it must be possible for the set time to be checked by the time server 5, and, if necessary, adjusted. We shall now describe more closely a possible time-checking method with reference to FIG. 2. The time check takes place preferably when the SIM card 10 is logged into the network 2; other checking algorithms can, however, be preferred, for example a time check at predefined time intervals, for example everyday, or only in cases of doubt.

The mobile device 1 with the identification card 10 according to the invention logs into the network 2 at the time t1 (logging in). The time server is informed about this logging in at the time t2, after a transmission time of $t_r$. The transmission time $t_r$ depends upon the location of the user in the network 2, among other things; for a particular location and at a particular time of day it is nearly constant.

In a variant, the time server 5 checks the precision of the integrated time-measuring device 100 after each logging in of a SIM card. In a first phase (t1 to t7), the transmission time $t_r$ is measured first; in a second phase (t8 to t13), the time and the operation of the time-measuring device is checked, and, if necessary, adjusted.

To measure the transmission time $t_r$, the time server 5 sends a $t_r$ check record 50 at the time t3 to the just checked SIM card 10 with the request that a reply be given immediately to this record. This record 50 is received by the card 10 at the time t4, after a transmission time $t_r$. After a known mobile device processing time $t_{MS}$, the SIM card 10 then responds at time t5 with a response record 51, which is received by the time server 5 at the time t6 after a transmission time $t_r$.

The time server 5 can then determine the transmission time $t_r$:

$$t_t = \frac{(t6 - t3) - t_{MS}}{2}$$

So that the time server does not have to carry out all calculations in real time, the received response records 51 are preferably first supplemented with an entry stamp by the SIM card 10, and are interim stored in a stack (not shown). This way the time server 5 only has the relatively simple stamping operation to carry out in real time; all subsequent calculations can be carried out later, depending upon the load on the server 5. The entry stamp indicates the time of receipt t6; the transmission time $t_r$ is only calculated at the time t7.

Figure 3:
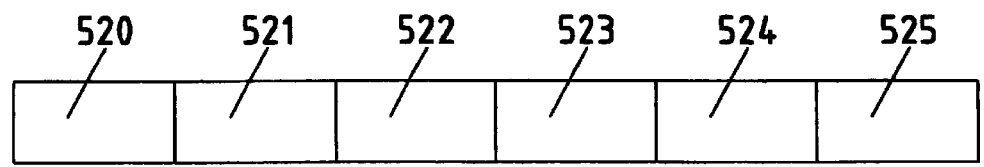
FIG. 3 shows schematically the structure of a time adjustment record.

After determining $t_r$, the time server 5 prepares at time t8 a time check record 52, which is sent at time t9 to the SIM card 10 after a processing time $T_{INF}$. FIG. 3 shows, as an example, the typical structure of a time check record. The record 52 contains a first header 520, for example a header in USSD format with the address of the recipient in the network. A second header 521 indicates that this message is a special message, which has to be processed by the said filter means 1010, 1011, preferably according to the SICAP method. A third header 522 indicates that the message is a time record. The fourth field 523 contains a time indication, for example the transmission time of the message t8. The field 524 contains the command to the SIM card 10 to send back a response after a period of time $t_{DELAY}$, indicated in this field, after the time indication 523. The indicated period of time $t_{DELAY}$ is determined by the server on the basis of a pseudorandom algorithm so that differing time check records contain different values for $t_{DELAY}$. The last field 525 contains a signature, preferably according to the TTP protocol, so that the SIM card 10 can check reliably whether the record received has really been generated by the time server and not by a forger.

The time check record 52 is transmitted through the network 2, and is received by the mobile device 1 at time t10, after a transmission time $t_r$. After a processing time $t_{MS}$, the data processing means in the SIM card 10 have analyzed and processed the received record. After an additional time $t_{DELAY}$, or in a variant $t_{DELAY}$ according to an indicated time in field 523, the SIM card 10, as requested, sends a response record 53 back to the time server 5. This response record is sent at time t11, and is received by the time server at time t12, after a transmission time $t_r$. This response will preferably be given a receipt stamp immediately upon arrival, and will be interim stored temporarily in a stack to be processed by the time server 5 only later.

The time server 5 then checks whether the response of the SIM card 10 was sent at the correct time $t11=t12-t_r$. If t11 is within a predefined tolerance range, then the time-measuring device 100 is operating correctly. In this case the user is registered in the network 2, and can use his mobile device if other prerequisites, such as, for example, that the card is not blocked, have been fulfilled.

If, however, t11 is not within the predefined tolerance range, an optional second check takes place with a new time check record. If this second test is also unsuccessful, the time measuring device 100 has to be adjusted again. In this case, the time server sends a time adjustment record (not shown) to the SIM card 10, with which the time and/or operation of the time-measuring device 100 is adjusted by means of the register 1015. In a variant, instead of the time-measuring device 100, 1015, the rating system 1014 is adjusted. In another variant, the tariff table 1013 is adjusted instead. In any case the transmission of the time check record takes place signed, and preferably encrypted, for example with TTP or PTP functions, so that no forger can send falsified records to manipulate the time set.

The various records 50–53 are transmitted preferably by the SIM server 3 through the telecommunications network 2 in the user information channel, so that the transmission time is kept as short as possible. In a preferred variant, the messages are transmitted as USSD messages through the signalling layer of the communications protocol. As the transmission time of SMS messages is not foreseeable, however, the records are preferably not transmitted through this channel.

Other mechanisms can also be provided to check, and if necessary correct, the set time in the SIM card 10. For example, the time server 5 can periodically check the set time, and, if necessary, generate a time setting record. Since, as explained later, the SIM card 10 transmits billing records and/or CDRs (Call Detail Records), which always include a time indication, the time established in the billing records can, in a variant, be checked so that the time-measuring device 100 can be subsequently adjusted if a time deviation is established statistically.

Important for international use is that the time-measuring device 100 can be continuously set at the time in the current time zone. In a variant, the time server 5 transmits a time setting record to the SIM card 10 upon each logging of the mobile device into a new time zone. In another variant, the mobile device determines its current geographical location after each logging in, and carries out the time zone correction itself with the aid of a time zone table stored in the map.

Parallel to this process, a check is made upon logging in of the mobile device as to whether the stored tariff table 1013 is up-to-date and complete. For this purpose, upon logging into the home network 2 or into a visited network, a record is transmitted to the tariff server 6 in the home network in which the current version of the tariff table is stored. If this tariff table in the SIM card 10 is no longer up-to-date, or if it has to be supplemented, a tariff record is generated by the tariff server 6, is TTP-encrypted and signed by the TTP server, and is transmitted through the SIM server 3 and the communications network 2 to the SIM card 10. The SIM card 10 then checks the signature of the received tariff record, and the stored tariff table is supplemented or adjusted if this signature is correct.

This tariff transmission method can also be employed each time the network operator makes a change in the tariffs and changes his tariff table in the tariff server 6. In this case, the tariff server can automatically send the new tariffs to all subscribers (initialization and updating of the tariff tables).

Since the memory capacity of the SIM card 10 is not unlimited, preferably no complete set of tariffs is stored, but instead only the tariffs for the telecommunications areas in which the user has often made connections based on statistics, and optionally for some predefined telecommunications areas. For example, stored in a new identification card are only the tariffs for connections within the respective home network or only tariffs for connections between the home network and some neighboring networks. If the user then logs into another network with his mobile device, then tariff tables for connections out of and into this new network are additionally stored in his identification card 10, according to the mechanism described above. The tariff tables can also be compressed to save memory space.

User-specific discount parameters can be associated with the stored tables so that a user can profit individually from corresponding discounts according to his use behavior. Discounts can be set up as desired according to various criteria. For example, a network operator can program discount parameters in SIM cards of employees in large enterprises or can also load them later. Special reductions, such as, for example, a toll-free number or lists of toll-free numbers can also be programmed in the tariff tables 1013 and/or as part of the rating system 1014. Other discount possibilities or, for example, time-limited offers can be transmitted and programmed with special messages in the SIM card. The users have the possibility of requesting a new type of subscription or of purchasing additional discount possibilities. The corresponding tariff tables and rating components can then be remotely loaded by the operator as an element of the tariff tables 1013 and/or of the rating system 1014.

The version of the tariff table which can be used for a subsequent statistical control is preferably stored in the connection details 10161. For the case where it is established later that the version used for billing was not the correct version, the current table of tariffs is transmitted to the SIM card 10, and a correction is made according to the mechanism described above.

We shall now describe how the billing for a connection is carried out.

In establishing a connection, the call number is analyzed by a suitable program in the protected area of the identification card 10. If the necessary tariff figures for the targeted region are to be found in the tariff table 1013 on the card 10, and the card is not blocked, the connection is actually completed. If the needed table elements are not available on the card, establishment of the call is preferably blocked and an updating record is sent to the tariff server 6 in order to load these data.

The parameters needed to analyze the fee to be billed are collected after signalling of the call set up. The connection fee depends, for example, among other things, on the duration of the call, the time of day, the day of the week, the location of the calling user (A) and of the called user (B), the tariff tables, and, if applicable, any possible user-specific discounts. All these parameters are either available in the identification card, or are determined using the integrated time-measuring device 100. Determination of the connection fee can thus be carried out by the rating system 1014 during and after the connection, based upon the time and duration of the connection established by the time-measuring device. The determined amount is then preferably shown on the display of the mobile device 1, and is stored, along with other information relevant for the billing, in a new line in field 10161 of the rating table 1016. In the case of a prepaid card, this fee is then subtracted from the amount 10162 in the preceding line. The new remaining amount 10162 can then be shown on the display of the mobile device 1, and can be stored on the new line in column 10162. If this remaining amount is less than a predefined value, for example less than or equal to zero, the SIM card 10 is preferably blocked. It can be used again only if a new monetary amount is loaded onto the card.

On the other hand, in the case of a post-paid card, the determined amount is added together with the total amount from the preceding lines of the table 1016, and the new total is stored in the respective line. If this amount is greater than the limit set by the network operator or by the customer, the card is preferably blocked. In this case it can only be unblocked when, for example, the customer has paid his telephone bill.

As already mentioned, the fee data 10161 in the table 1016 can be packed in a billing record, provided with a TTP signature, and transmitted to the billing collector 4 through the telecommunications network 2. In a prepaid card, this transmission takes place only for checking and statistical purposes, for example periodically or upon logging in of the SIM card. In a post-paid card, this transmission takes place preferably upon the initiative of the SIM card, for example after each connection or in batch mode upon logging in, or for example after a predefined time period or number of connections. The transmitted billing details are indicated and marked in the column 10160. The billing records are sorted in the billing collector 4 according to financial services provider, and are transmitted to the corresponding financial services provider. This financial services provider then sends the user a bill or debits his account. Possible financial services providers are, for example, the network operators themselves, or also a bank, a credit card company or other collection points. Since the billing records already represent a billing section, the network operator no longer needs to administer any billing system of his own.

Since all the elements for a statement of charges are available in the billing record, they can be made available to the customer, for example, via Internet or by post. Billing records are TTP-encrypted and signed, as already mentioned. It is thus ensured that only the entitled customer can access his statement of charges.

One skilled in the art will note that prepaid and post-paid billing systems according to the invention can be used in parallel in the same telecommunications system.

Parallel to the billing records generated on the SIM cards, conventional CDRs (Call Detail Records) are preferably generated in the infrastructure of the GSM network which are used for checking the billing records and for further statistics.

This method can be used not only to bill telephone connections of the user of the SIM card, but also to bill use of other resources on the card 10. In principle, using this method, all operations for which all the billing parameters are available on the SIM card 10 can be billed. For example, use of the programs stored in the memory area of the card or use of the inductive or infrared interface can also be billed, for example based on the duration of use. Value-added services or access to the Internet can likewise be billed with this method. Goods can also be ordered, for example, through the mobile network 2 and can be billed with the rating system 1014 according to the invention. In this case billing components, for example the price of the purchased goods, are preferably transmitted to the rating system 1014 through the network.

This billing method can be used in any network which is connected to the home network of the user through a roaming agreement. The area of application, therefore, is not limited to a home GSM network; use is possible globally in all telecommunications networks, independently of the network structure. The method can also be used with communications systems other than the GSM system.

This billing method can be used by several network operators. In this case each network operator preferably has his own tariff server 6. The various tariff servers are preferably connected to one another, however, so that tariff adjustments need only to be carried out once internationally. In a variant, all tariff tables are stored in a master tariff server to which all network-specific tariff servers are able to have access in order to determine their tariffs. In a further variant, all network operators access the same tariff server 6, administered by all. The administration of the network-specific tariffs in the tariff server can be carried out by the individual network operators through a cryptographically-protected process. All tariff servers preferably use a single currency, for example SDR, Euros or dollars.

One skilled in the art will note that the network operator does not need to know the complete identity of the customer in the case of a prepaid card. In this case, complete anonymity of the user can be ensured.

One skilled in the art will note that this invention can be applied in billing operations in almost every type of telecommunications network, for example in a pay-TV network or in the Internet. In this last-mentioned case, the various aforementioned messages are transmitted, for example, as e-mail.

What is claimed is:

1. Identification card for users of a communication terminal in a telecommunications network, which card can be inserted into the communication terminal in a removable way, comprising:

data processing means which make possible the storage of data including at least identification data of the user;

an integrated time-measuring device, with which a duration and a time of the connections in the telecommunications network carried out with said identification card are measured; and rating means, with which the connection fees are determined based upon the duration of use and time established with the integrated time-measuring device;

wherein said time measuring device further comprises at least one adjustment register integrated in the identification card with which the time-measuring device integrated in the identification card can be adjusted, and an interface for an external clock signal with which the time-measuring device integrated in the identification card is synchronized.

2. Identification card according to claim 1, wherein said adjustment register can be adapted with special messages transmitted through said telecommunications network.

3. Identification card according to claim 1, wherein said adjustment register is stored in a protected area of the identification card not accessible to the user.

4. Identification card according to claim 3, wherein said adjustment register can only be changed with signed adjustment records from a time server in the telecommunications network.

5. Identification card according to claim 1, further comprising at least one stored tariff table, and in that a rating system determines the connection fees based upon said tariff table.

6. Identification card according to claim 5, wherein said identification card is further configured to recognize and copy the tariff tables received in special short messages through the communications network.

7. Identification card according to claim 5, further comprising decryption means to decrypt received encrypted tariff table components.

8. Identification card according to claim 6, further comprising signature checking means to check whether the received tariff tables have been transmitted by an authorized tariff server.

9. Identification card according to claim 1, further comprising a prepaid account against which the charged connection fees are directly debited.

10. Identification card according to claim 1, further comprising means to charge to the user operations other than connections using said rating system and said time-measuring device.

11. Identification card according to claim 1, further comprising an independent energy storage device, which feeds at least the time-measuring device.

12. Identification card according to claim 1, further comprising a rating table in which connection details on at least one already carried-out connection or operation are stored.

13. Identification card according to claim 12, further comprising means to pack said connection details in billing records and to transmit them to a billing collector in said telecommunications network.

14. Identification card according to claim 13, further comprising signing means to sign said billing records before they are transmitted to the billing collector.

15. Identification card according to claim 13, wherein said identification card can transmit said billing records in batch mode to the billing collector.

16. Identification card according to claim 13, wherein said identification card can transmit said billing records to the billing collector immediately after each connection.

17. Identification card according to claim 13, wherein said identification card can transmit said billing records to the billing collector when logging in.

18. Identification card for users of a communication terminal in a telecommunications network, which card can be inserted into the communication terminal in a removable way, comprising:

data processing means which make possible the storage of data including at least identification data of the user;

an integrated time-measuring device, with which a duration and a time of the connections in the telecommunications network carried out with said identification card are measured; and rating means, with which the connection fees are determined based upon the duration of use and time established with the integrated time-measuring device;

wherein said time measuring device further comprises
at least one integrated adjustment register with which the time-measuring device can be adjusted, and
an interface for an external clock signal with which the integrated time-measuring device can be synchronized,
wherein the frequency of said external clock signal can be determined with the integrated time-measuring device, and
said time-measuring device further including a division factor, wherein said division factor can be adjusted based on said determined frequency.

19. Identification card according to claim 18, wherein said identification card is further configured to store an indication of the determined information on the frequency of said clock signal in a memory area of said identification card.

20. Billing method for billing to a user the use of at least one operation with an identification card inserted in removable way in a communication terminal in a telecommunications network, which identification card comprises an integrated time-measuring device and on which identification card data are stored including at least identification data of the user, comprising:

adjusting the time-measuring device by means of an adjustment register integrated in the identification card the identification card;

synchronizing the time-measuring device integrated in the identification card with an external clock signal generated outside the identification card via an interface of the identification card;

measuring a duration and time of connections in the telecommunications network carried out with said identification card; and determining the connection fees by rating means of the identification card based on a duration and time measured with the integrated time-measuring device.

21. Billing method according to claim 20, wherein the connection fees are determined based upon tariff tables stored in the identification card.

22. Billing method according to claim 21, wherein said tariff tables are stored in a tariff server and can be copied into the identification card through a said telecommunications network.

23. Billing method according to claim 20, wherein after logging in of an identification card in a telecommunications network the tariff server checks the version of the tariff tables stored in said identification card, and, if necessary, transmits the most recent version onto said identification card.

24. Billing method according to claim 20, further comprising a time controller transmitting time check records to the identification card to check the time set, and, if the time is not set correctly, transmitting a time setting record to this identification card.

25. Billing method according to claim 24, further comprising electronically signing the transmitted time setting records by the time server.

26. Billing method according to claim 20, further comprising debiting the determined connection fees directly against a prepaid account in the identification card.

27. Billing method according to claim 20, further comprising packing the connection details necessary to determine the connection fees in billing records and transmitting the connection details to a billing collector.

28. Billing method according to claim 27, further comprising electronically signing the billing records by the identification card.

29. Billing method according to claim 28, further comprising sorting the billing records transmitted to the billing collector and transmitting the sorted billing records to a corresponding financial services provider.

30. Billing method according to claim 20, further comprising billing the use of resources in the identification card not responsible for carrying out communication using said time measuring device.

* * * * *

UNITED STATES PATENT AND TRADEMARK OFFICE
CERTIFICATE OF CORRECTION

PATENT NO.    : 6,543,686 B1  
DATED         : April 8, 2003  
INVENTOR(S)   : Ritter Page 1 of 1

It is certified that error appears in the above-identified patent and that said Letters Patent is hereby corrected as shown below:

<u>Title page,</u>  
Item [73], should read as follows:  
-- [73] Assignee: Swisscom Mobile AG, Bern (CH) --

Signed and Sealed this

Fifth Day of August, 2003

JAMES E. ROGAN  
*Director of the United States Patent and Trademark Office*